(12) United States Patent
Kelly

(10) Patent No.: US 8,605,036 B1
(45) Date of Patent: Dec. 10, 2013

(54) FINGER CONTROL AND DATA ENTRY DEVICE

(75) Inventor: John T. Kelly, Murrieta, CA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 444 days.

(21) Appl. No.: 13/073,058

(22) Filed: Mar. 28, 2011

(51) Int. Cl.
G09G 5/00 (2006.01)

(52) U.S. Cl.
USPC .......................................... 345/169; 345/156

(58) Field of Classification Search
USPC ........................... 345/156–158, 163, 168, 169
See application file for complete search history.

(56) References Cited

U.S. PATENT DOCUMENTS

| | | |
|---|---|---|
| 3,700,836 A | 10/1972 | Rackson |
| 4,016,775 A | 4/1977 | Carlson |
| 5,563,628 A | 10/1996 | Stroop |
| 5,657,012 A | 8/1997 | Tait |
| 5,940,066 A | 8/1999 | Weinblatt |
| 2009/0212979 A1 | 8/2009 | Catchings |

*Primary Examiner* — Ricardo L Osorio
(74) *Attorney, Agent, or Firm* — Donna P. Suchy; Danile M. Barbieri

(57) ABSTRACT

A finger control and data entry device that includes a retaining element adapted to fit on at least one finger of an operator. The retaining element has an outer mounting surface thereon. Pushbuttons are mounted on the mounting surface. A touch strip is mounted on the mounting surface. A controller is operably connected to the pushbuttons and the touch strip for the interface handling of a communications link. A communications link is operably connected to the controller to provide an output signal for use by an end system. Power is provided to the controller. Utilization of the pushbuttons in combination with the touch strip on the retaining element provides a finger-based system control. The inclusion of vibrating sensors within the device enables a direct means of information and/or status feedback.

18 Claims, 3 Drawing Sheets

FIG. 1
FIG. 2
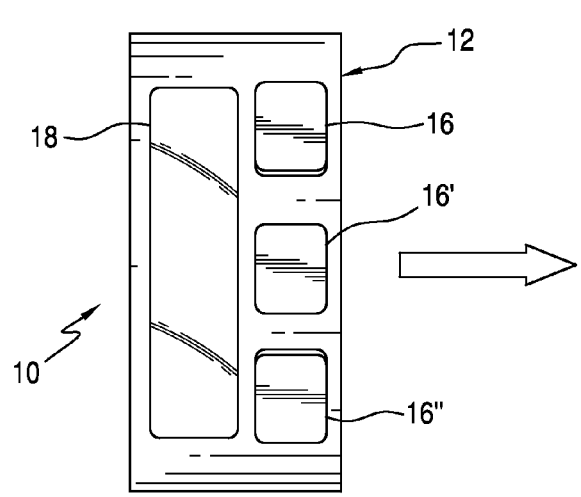
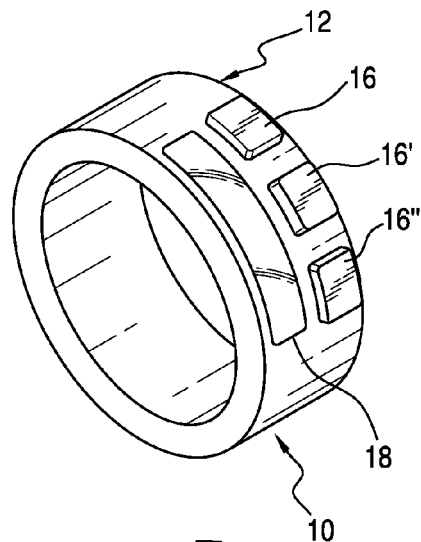
FIG. 3
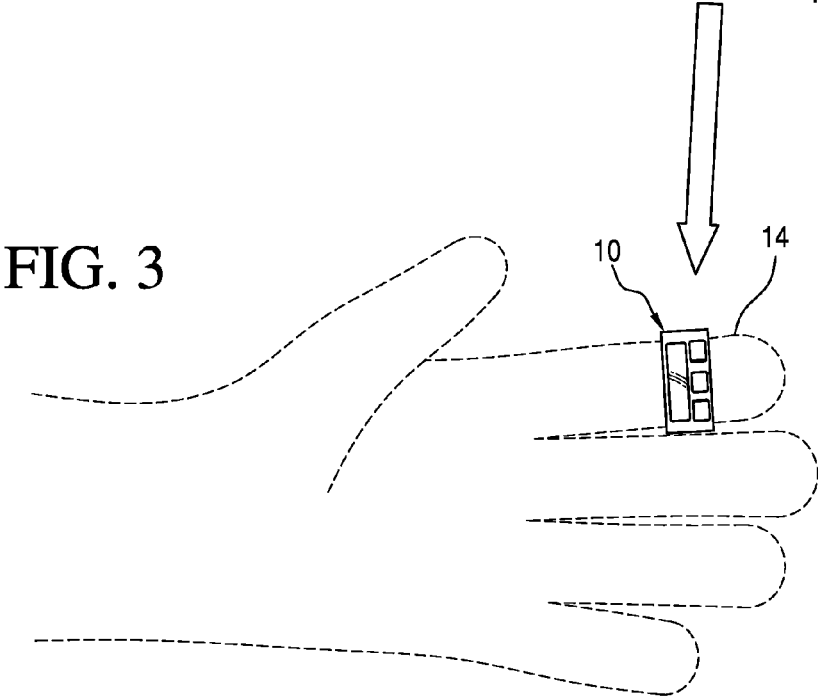

FINGER CONTROL AND DATA ENTRY DEVICE

BACKGROUND OF THE INVENTION

1. Field of the Invention

The present invention relates generally to device controllers, and more particularly to a compact finger-based control input device.

2. Description of the Related Art

The rise of electronic device/system development and use by individuals often incurs issues in how one can control such devices in specific configurations or when performing certain actions or movements. Similarly, data entry can be difficult to perform efficiently, often limited to keyboard-based hand-entry solutions that may not be appropriate for specific users. One example: For the case of a dismounted soldier (in which the growth of wearable soldier computing and sensing systems is increasing), an added difficulty is the common requirement to engage a constant offensive posture by carrying a weapon (often rifle). In this posture, the user cannot typically utilize keyboard or other hand based controller solutions common to several devices.

Given limited motion or use of a control or data entry hand, the ability to maintain grip or contact with a weapon while providing positive control and data entry potential using contact between one or two fingers is highly desired. Specifically, the ability to enable system control using a single finger would provide a wide array of usable configurations. While other modalities such as audio and visual exist for input/output capabilities, use of haptic/touch controls would provide direct positive response with broad acceptance, low training, and wide utility.

There are numerous patents that have issued that have involved attempts to address portions of the above described problem, with most focused in the commercial computing workspace environment. These include:

U.S. Pat. No. 4,016,775, entitled "FINGER ACTUATED CONTROLLER," discloses a mechanical interface operated by pressure from a finger with left and right motion and ability to return to a neutral location, position sensors of various possible types to denote displacement, and the ability to provide a control output of various forms.

U.S. Pat. No. 5,563,628, entitled "HAND HELD COMPUTER CURSOR CONTROLLER AND COMMAND INPUT DEVICE," discloses a gun-like platform held in the hand with thumb operated cursor stick and two control/input buttons to mimic a mouse in operation with a computer. A focus of the effort of that invention is to highlight the natural design of the enclosure for ergonomic operation and ability to not require placement on even surfaces.

U.S. Pat. No. 5,657,012, entitled "FINGER OPERABLE CONTROL DEVICE," discloses a finger-operated touch surface based on a grouping of capacitive plates that approximate a joystick in surface operation using a finger to swipe over and requires positive finger contact to operate.

U.S. Pat. No. 5,940,066, entitled "FINGER-MOUNTED COMPUTER INTERFACE DEVICE," discloses a finger-mounted "computer interface device" focused on a stylus-based cursor controller requiring contact with a surface or display screen element, a switch, and a transmitter element and battery.

U.S. Pat. No. 3,700,836, entitled "HAND HELD FINGER CONTROLLED SWITCH DEVICE WITH FLEXIBLE WRIST STRAP MOUNT," discloses an in-hand platform anchored by one finger and operated by chording of fingers, a retention strap, and mechanical switches or sonic or electromagnetic based controls. Is is primarily for dental operations.

U.S. Pat. Appln. No. 20090212979, entitled "GLOVE-BASED INPUT DEVICE," discloses a glove platform with selectors, varied motion sensing devices, a processing unit, and transceiver to a TBD system receiver element.

None of the aforementioned devices provide a holistic solution to addressing the specific dependencies of the high stress, minimalist, non-commercial workspace or non-gaming based environments (with the real-world duality of operating and holding equipment while requiring system interface control and feedback from an end system of some kind) common to both warfighters and even first responders. Such environments typically involve a high need for eyes-free operation, immediate positive touch-based response and control guidance to operate, inability to commit a full hand to user interface actions, likelihood of hand occupation with items or weapons requiring use during user interface actions, limited hand or finger real estate for control placement and/or interaction, and challenged cognitive bandwidth desiring simple and direct interface approaches. Furthermore, a solution in such an environment cannot generally be dependent on equipment-based elements (gloves) that lack standardization of issue to all users and have high customization or alternative of wear (used sometimes) conditions. An accessory-based approach able to adapt to any hand encasement situation (glove/no glove, variation of hand sizes, variation of hand poses and occupations) is highly desired in a compact form with interface modalities selected to maximize available system functions and controls while not overburdening the result with components that may interfere with the critical operation of the hand-held weapon or device while in use.

SUMMARY OF THE INVENTION

In a broad aspect, the present invention is a finger control and data entry device that includes a retaining element adapted to fit on at least one finger of an operator. The retaining element has an outer mounting surface thereon. Pushbuttons are mounted on the mounting surface. A touch strip is mounted on the mounting surface. A controller is operably connected to the pushbuttons and the touch strip for the interface handling of a communications link. A communications link is operably connected to the controller to provide an output signal for use by an end system. Power is provided to the controller. Utilization of the pushbuttons in combination with the touch strip on the retaining element provides a finger-based system control. The inclusion of vibrating sensors within the device enables a direct means of information and/or status feedback.

In one embodiment, the present invention provides selection of controls such as contact-required buttons and a touch strip in a compact but usable manner, suitable for access by a single finger. In a wireless implementation the device can be made further useful by retaining its placement directly on the hand/finger continuously, increasing its availability. With the addition of haptic/tactile output response sensors such as tactile buzzers, the capability to provide contact-based output to the user further extends the capability of this control device. The present invention therefore operates as a very compact (preferably single) finger-based control input device with tactile output capability in wired or wireless fashion.

The present invention's selection of contact-required (alternatives include press to hold action) buttons and touch strip provides a wide selection of control function through customizable capability assignment of each control element and their combination. When used jointly with an appropriately tailorable end system, the interface can enable numerous actions for function and variable selection, area and object assignment and selection, and both discrete and fine motion (via the touch strip) inputs.

Additionally, when utilized with embedded motion sensing elements, the present invention provides an additional modality of input via small and large motion actions by the user when wearing or simply holding the device. This further extends the available actions possible as inputs by the user to the end system, or may (by working jointly with the selected feedback/vibrating sensors) be used as a means of guiding user hand location or pose by the end system as well.

The present invention's intended operation entails wear on one or more fingers of an occupied (or non-occupied) hand. When comprised of a flexible strap or buckle, the present invention accommodates mounting and use with a large range of hand sizes and gloved/covered hand combinations, enabling maximal location of controls for finger/fingertip access while eliminating dependency on any specific element of clothing (e.g. gloves).

BRIEF DESCRIPTION OF THE DRAWINGS

FIG. 1 is a top perspective view of a first embodiment of the finger control and data entry device of the present invention.

FIG. 2 is a front and side perspective of the embodiment of FIG. 1.

FIG. 3 is a perspective view of the device positioned on the finger of the operator.

The same elements or parts throughout the figures of the drawings are designated by the same reference characters, while equivalent elements bear a prime designation.

DETAILED DESCRIPTION OF THE INVENTION

Figure 4:
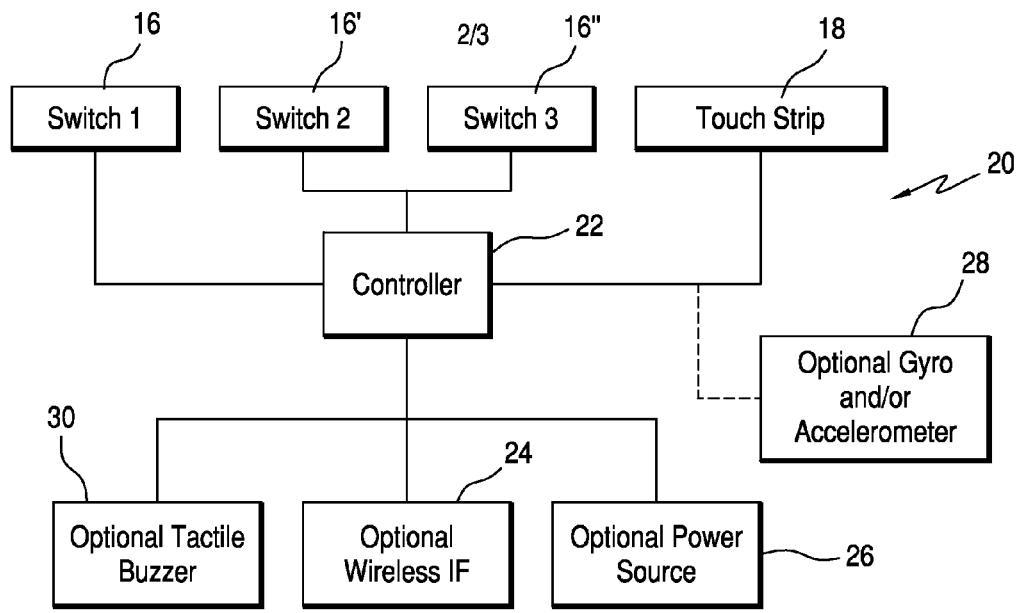
FIG. 4 is a functional system block diagram of the present invention.

Referring now to the drawings and the characters of reference marked thereon, FIGS. 1-3 illustrate a first embodiment of the finger control and data entry device of the present invention, designated generally as 10. The device 10 includes a retaining element, designated generally as 12, adapted to fit on a single finger 14 of an operator. The retaining element 12 has an outer mounting surface thereon. A plurality of pushbuttons 16, 16', 16" are mounted on the mounting surface. A touch strip 18 is mounted on the mounting surface. For this single finger implementation the retaining element comprises a ring element. The retaining element 12 may be formed of, for example, rigid or flexible material depending on the preferred manifestation of the device. A combination of both enables an electronics casing and flexible mounting approach. Retention approaches can be utilized using hook and loop fasteners, a buckle, or other means.

Referring now to FIG. 4, a functional system block diagram of the present invention is illustrated, designated generally as 20. A controller 22 is operably connected to the pushbuttons 16, 16', 16" and the touch strip 18 for the interface handling of a communications link 24. The controller 22 may be, for example, a small microcontroller enabling a compact combination of the relevant interface circuitry described for the attached control and sensor elements. The primary control elements of buttons (switches) 16, 16', 16" and touch strip 18 are augmented by the inclusion of optional motion sensing elements, such as an accelerometer(s) and/or gyroscopic component(s) used separately or in combination for providing motion sense, velocity, and potentially displacement and orientation outputs.

Some type of means provides power to the controller. It may be, for example a power source retained within the retaining element 12 operably connected to said controller. Such a retained power source may be, for example, an integrated self power source (i.e. battery/charge cell). Other types of means for providing power to said controller may include non-contact inductive means for transferring power without physical connection to the device. Other example power means may include wired sources or optical RF. A wired or contact implementation is also possible. Power may be also provided either by the user (via worn system) or by the device held by the user (e.g. weapon or other device with accessible power element).

The communications link 24 is operably connected to the controller 22 to provide an output signal for use by an end system. The communications link 24 may be, for example, a wired link or a wireless communication implementation which, at a minimum, exchanges control inputs derived by the device and user to an end system. A manifestation of a wired communications link may be a serial, I2C, or USB enabled interface, while a manifestation of a wireless link may be a Bluetooth wireless interface or modulation of data via magnetic coupled interface using a variety of data modulation choices. One manifestation of the data types intended for exchange could include pushbutton status (pressed, held, in hold), touch strip status (pressed, sector(s) contacted, time of press, pressure or velocity of press if suitable sensor is used), motion sensor axis status (pose, orientation, motion/acceleration, velocity, and potentially displaced distance with suitable software and sensors used), tactile vibrator status (active, duration, frequency), power status (on/off, power available if located in device independently).

Utilization of the pushbuttons 16, 16', 16" in combination with the touch strip 18 on the retaining element 12 provides a finger-based system control. FIG. 1 shows three pushbuttons 16. Three pushbuttons 16 are preferred because of the ability to provide a high number of discrete control or input actions both in separate operation and in combination with the other pushbuttons and/or the touch strip. The pushbuttons 16 may include the capability to press and release and/or press and hold which further extends the available control input functions made available by the device.

As mentioned above, the device 10 may optionally include a position sensor 28 operably connected to the controller 22 for providing motion sensing. The motion sensor 28 may be, for example, a gyroscopic sensor operably connected to the controller for at least one axis of motion sensing. Alternatively, or in addition, the motion sensor 28 may be an accelerometer operably connected to the controller 22 for at least one axis of motion sensing. As stated previously, the additional control inputs available by the device via these approaches is greatly increased to potentially include various sensing—e.g. motion, velocity, relative displacement, and orientation—generating a significant number of control input options to the user. Furthermore, by addition of these sensors, the device may be commanded by the end system to provide feedback to the user to guide a hand action or motion, as well, extending the utility of the device.

The touch strip 18 may, for example, provide the function of slide/contact entry; motion change entry; or, area-designated button entry. This extends the potential modalities for control entry to include area-selectable tap, press and hold, area-selectable slide, and potential time of press, pressure-based, and/or velocity based entry actions.

The device 10 may include one or more tactile sensor elements ("buzzers") 30 operably connected to the controller 22. The tactile element 30 may be commanded by either the user or the end system to provide select feedback (e.g. when a specific action is enabled or input used, as an alert indicator, or for end system status or guidance to the user). Through use of frequency modification and pulsed activation, additional modes (e.g., impact/"volume" and duration of vibration) can be provided to further enable additional device interaction to the user by means of activating the tactile sensor element by the end system for status alerting, modulated/pulsed messaging of information, and user hand motion feedback or guidance.

The communications link 24 may include the capability to provide an encrypted interface signal. The provision of appropriate or desired encryption may be applied in joint by selection of the appropriate or desired communications link, and be manifested in either hardware or software. The encryption provision may be negated or not required depending upon user requirements.

It may provide an input signal from the end system for providing status and/or guidance inputs to the device, thereby providing a bidirectional communications link. Thus, it may provide the potential for the system 20 to guide the user's hand via use of the tactile buzzer and motion sensors previously described.

Figure 5:
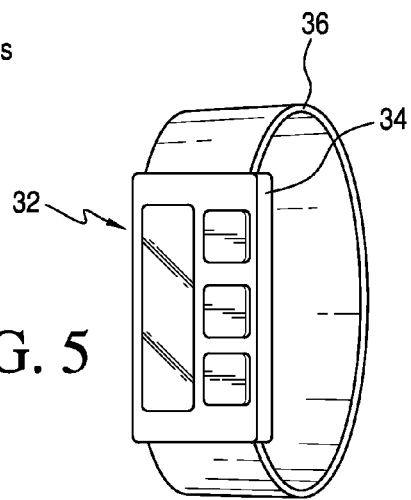
FIG. 5 shows a front and side perspective view of a second embodiment of the device utilized on three fingers of the operator.
Figure 6:
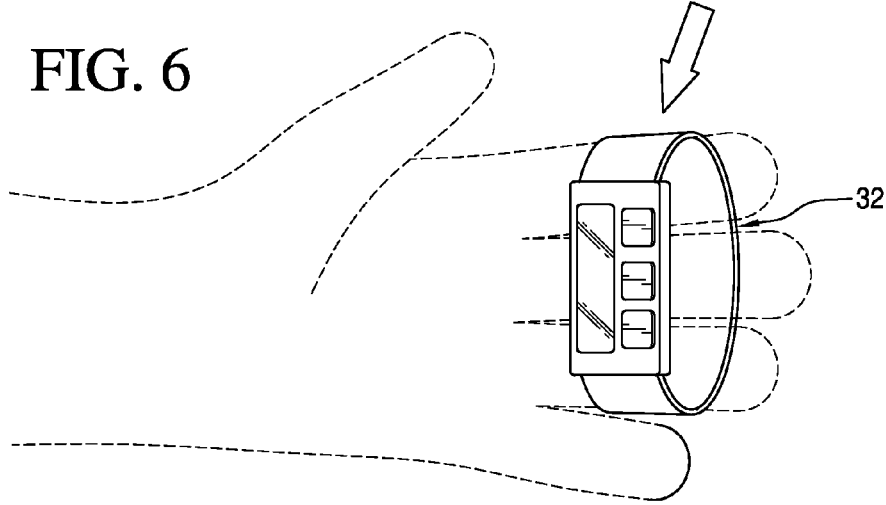
FIG. 6 is a perspective view of the device of FIG. 5 positioned on the finger of the operator.

Referring now to FIGS. 5 and 6, a second embodiment of the device utilized on three fingers of the operator, is illustrated, designated generally as 32. As shown, in FIG. 5, the electro/mechanical components of the device 32 may be mounted on a rigid support structure 33 if a flexible retaining element 36 is utilized. An additional manifestation utilizing only flexible support structure elements may also be foreseen to encase the device's functional elements.

Figure 7:
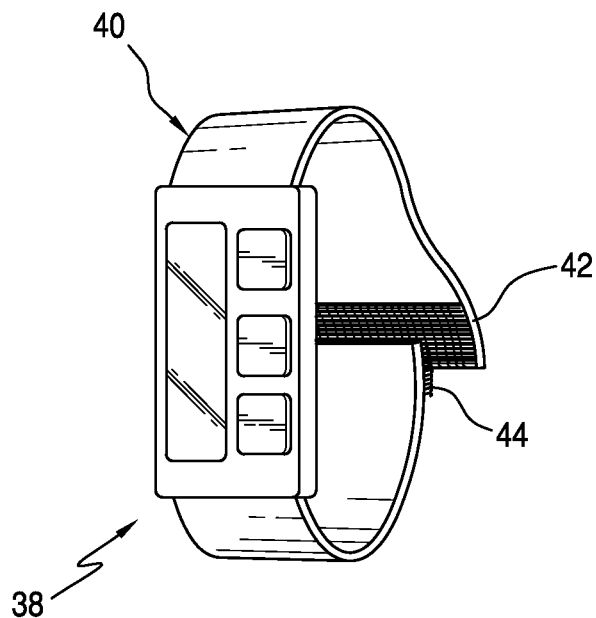
FIG. 7 is a perspective view of another embodiment of the present invention which uses a hook and fastener adjustment means.
Figure 8:
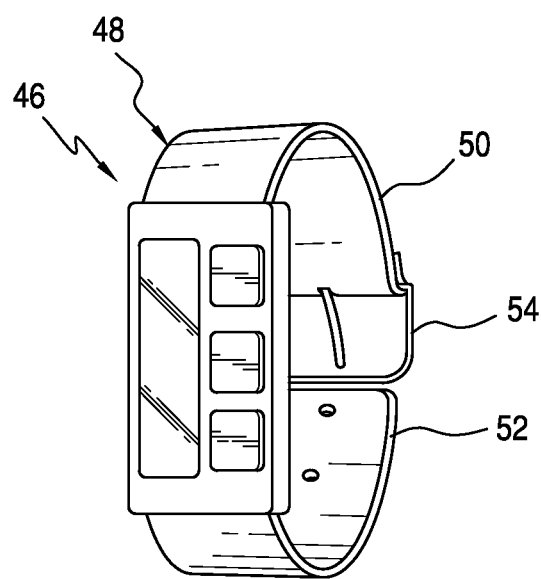
FIG. 8 is a perspective view of another embodiment of the invention which utilizes a buckle for adjustment.

The ability to enable a flexibly adjustable retention approach to the case or mounting structure may also be applied. Referring to FIG. 7, an adjustable device is illustrated, designated generally as 38, where the retaining element 40 includes VELCRO® hook and fastener means 42, 44. Referring now to FIG. 8, another adjustable device is illustrated, designated generally as 46, where the retaining element 48 includes flexible material 50 and an adjustable buckle or snap mechanism 52, 54.

In use, a user may locate the device on a finger with access to the control pushbuttons and touch strip provided by the thumb while the hand is occupied or wrapped around a tool such as a weapon stock or grip or hose or shovel. As another manifestation of use, a user may desire to locate the device around multiple fingers with the control elements facing either palm in or to the outside of the fingers depending on comfort and utility provided by how the hand may be occupied with a separate tool or other item.

In operation, a user may utilize the control elements to provide push to talk for use of a separate communications system and using voice to contact other users. The control elements may also be used to select functions based either on the provided tactile buzzer feedback, simple assignment (button 16 is function 1, etc.), or by other interface means provided to the user by the end system (e.g. a display element showing menu selections). A control element may also enable cursoring within another interface element such as a display to the user and enable selection of identified objects or functions. The tactile vibration capability may be activated by the end system to indicate a change of system status, sensor detection state, or other functionality to the user. The user may utilize the motion sensor capability to create a gesture-based input using a uniquely described series of motions or patterns recognized by the end system. Additionally, the user may combine a gesture such as pointing with other sensors and capabilities in the end system (e.g. a geolocation sensor noting user position) to create an aiming vector used by the end system to direct other users or actions. Further, the end system may, by creating vibratory feedback in volume and modulation, guide the user's hand posture and location to a specific pattern or location desired for an end function such as signing communication or leadership gesture learning, or may be utilized as a method to direct the user to a specific direction or location.

Other embodiments and configurations may be devised without departing from the spirit of the invention and the scope of the appended claims.

The invention claimed is:

1. A finger control and data entry device, comprising:
   a) a retaining element adapted to fit on at least one finger of an operator, said retaining element having an outer mounting surface thereon;
   b) a plurality of pushbuttons mounted on said mounting surface;
   c) a touch strip mounted on said mounting surface;
   d) a controller operably connected to said pushbuttons and said touch strip for the interface handling of a communications link;
   e) a communications link operably connected to said controller to provide an output signal for use by an end system; and,
   f) means for providing power to said controller;
   wherein utilization of said pushbuttons in combination with said touch strip on said retaining element provide a finger-based system control.

2. The device of claim 1, wherein said retaining element comprises a ring element adapted to fit on a single finger of an operator.

3. The device of claim 1, wherein said retaining element includes the capability to be worn over more than one finger.

4. The device of claim 1, wherein said means for providing power to said controller comprises a power source retained within said retaining element operably connected to said controller.

5. The device of claim 1, wherein said means for providing power to said controller comprises non-contact inductive means for transferring power without physical connection to the device.

6. The device of claim 1, further including at least one motion sensor operably connected to said controller for providing motion sensing.

7. The device of claim 1, further including a gyroscopic sensor operably connected to said controller for at least one axis of motion sensing.

8. The device of claim 1, further including an accelerometer operably connected to said controller for at least one axis of motion sensing.

9. The device of claim 1, wherein said plurality of pushbuttons comprises three pushbuttons.

10. The device of claim 1, wherein said plurality of pushbuttons includes the capability to press and release and/or press and hold.

11. The device of claim 1, wherein said communications link includes the capability to provide an encrypted output signal.

12. The device of claim 1, wherein said touch strip provides the function of slide/contact entry.

13. The device of claim 1, wherein said touch strip provides the function of motion change entry.

14. The device of claim 1, wherein said touch strip provides the function of area-designated button entry.

15. The device of claim 1, further including at least one tactile sensor element operably connected to said controller.

16. The device of claim 1, wherein said communications link further provides an input signal from said end system for providing status and/or guidance inputs to said device, thereby providing a bidirectional communications link.

17. The device of claim 1, wherein said output signal for use by an end system comprises an output signal for use by a weapon system.

18. A method for providing finger-based system control of a finger control and data entry device, comprising the steps of:

a) placing a retaining element adapted to fit on at least one finger of an operator, said ring element having an outer mounting surface thereon;

b) depressing pushbuttons mounted on said mounting surface;

c) engaging a touch strip mounted on said mounting surface, wherein said depressing of said pushbuttons and engagement of said touch strip provide an output signal for use by an end system;

wherein said output signal is provided by a controller operably connected to said pushbuttons and said touch strip for the interface handling of a communications link, said communications link operably connected to said controller to provide said output signal, and wherein utilization of said pushbuttons in combination with said touch strip on said retaining element provide a finger-based system control.

* * * * *